Figure 1:
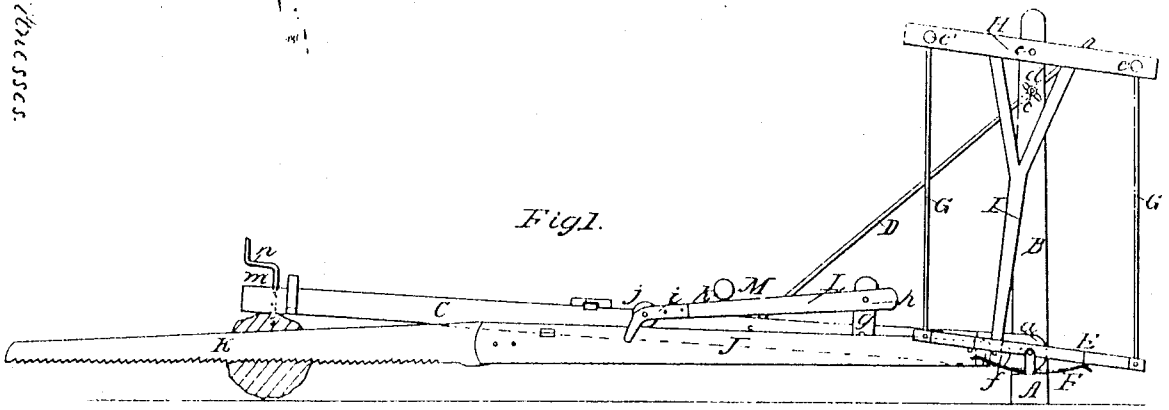
Figure 2:
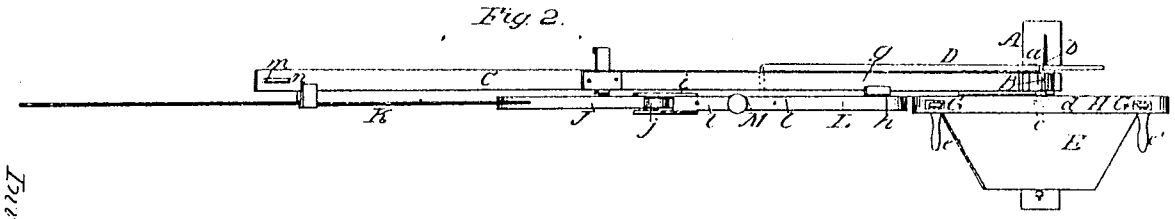

BEST AVAILABLE COPY

Heth & Hall,

Drag Saw.

No. 215. A. I. Patented Jan. 11, 1859.

Witnesses.
A. W. Freeland
Harrison Heath

Inventor.
Albert Heth
Gayler Hall.

A.M. PHOTO-LITHO. CO. N.Y. (OSBORNE'S PROCESS.